(12) United States Patent
Bird

(10) Patent No.: US 6,767,039 B2
(45) Date of Patent: Jul. 27, 2004

(54) BUMPER ASSEMBLY

(75) Inventor: James Bird, Oak Ridge, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/219,404

(22) Filed: Aug. 15, 2002

(65) Prior Publication Data

US 2004/0032133 A1 Feb. 19, 2004

(51) Int. Cl.$^7$ .............................................. B60R 19/04
(52) U.S. Cl. ........................ 293/154; 293/150; 293/151
(58) Field of Search ........................ 293/50, 114, 120, 293/126, 149–155

(56) References Cited

U.S. PATENT DOCUMENTS

| | | | | |
|---|---|---|---|---|
| 996,207 A | * | 6/1911 | Brown et al. ............... | 293/150 |
| 1,224,817 A | | 5/1917 | Westover .................... | 293/150 |
| 1,375,244 A | * | 4/1921 | Whitney ..................... | 293/150 |
| 1,584,081 A | * | 5/1926 | Douglas ..................... | 293/107 |
| 1,627,317 A | * | 5/1927 | Cox ......................... | 293/111.1 |
| 1,651,005 A | | 11/1927 | Veale ........................ | 293/150 |
| 1,661,786 A | * | 3/1928 | Bullard, Jr. ................. | 293/146 |
| 1,705,119 A | | 3/1929 | Jacobs ....................... | 293/150 |
| 1,717,855 A | * | 6/1929 | Schleiff ..................... | 293/131 |
| 1,723,832 A | | 8/1929 | Yanss ........................ | 293/149 |
| 2,896,735 A | | 7/1959 | Bohn ......................... | 180/274 |
| 2,954,256 A | | 9/1960 | Barenyi ...................... | 293/136 |
| 3,596,963 A | | 8/1971 | Phillips ..................... | 293/6 |
| 3,820,834 A | | 6/1974 | Wilfert et al. ............... | 293/150 |
| 3,830,539 A | | 8/1974 | Yoshie et al. ................ | 293/149 |
| 3,843,180 A | | 10/1974 | Alexander .................... | 293/150 |
| 3,924,888 A | | 12/1975 | Butcher et al. ............... | 293/150 |
| 4,099,759 A | | 7/1978 | Kornhauser ................... | 293/110 |
| 4,225,167 A | | 9/1980 | Buettner et al. .............. | 293/120 |
| 4,251,096 A | | 2/1981 | Stock ........................ | 293/150 |
| 4,391,464 A | | 7/1983 | Masotti et al. ............... | 293/120 |
| 4,422,680 A | | 12/1983 | Goupy ........................ | 293/122 |
| 4,783,104 A | * | 11/1988 | Watanabe et al. .............. | 293/102 |
| 4,811,979 A | | 3/1989 | Peter et al. ................. | 293/102 |
| 4,838,593 A | | 6/1989 | Fleming et al. ............... | 293/126 |
| 4,895,405 A | * | 1/1990 | Sasatake et al. .............. | 293/102 |
| 5,000,499 A | | 3/1991 | Shephard et al. .............. | 293/150 |
| 5,022,692 A | * | 6/1991 | Horansky et al. .............. | 293/128 |
| 5,498,044 A | | 3/1996 | Bovellan et al. .............. | 293/120 |
| 5,566,777 A | | 10/1996 | Trommer et al. ............... | 180/232 |
| 5,577,784 A | | 11/1996 | Nelson ....................... | 293/120 |
| 5,882,054 A | * | 3/1999 | Devilliers et al. ............ | 293/155 |
| 6,082,811 A | | 7/2000 | Yoshida ...................... | 296/187.03 |
| 6,135,517 A | * | 10/2000 | Cordebar ..................... | 293/155 |
| 6,209,935 B1 | * | 4/2001 | Kavc et al. .................. | 293/155 |
| 6,290,272 B1 | | 9/2001 | Braun ........................ | 293/120 |
| 6,371,540 B1 | | 4/2002 | Campanella et al. ............ | 293/102 |

FOREIGN PATENT DOCUMENTS

EP 0 779 183 A1 6/1997

* cited by examiner

*Primary Examiner*—D. Glenn Dayoan
*Assistant Examiner*—Paul Chenevert
(74) *Attorney, Agent, or Firm*—Watts Hoffmann Co., L.P.A.

(57) ABSTRACT

A bumper assembly of an over the highway vehicle. The bumper assembly includes first and second mounting flanges coupled to a chassis component of the over the highway vehicle. A first bumper section is connected to the first mounting flange. A second bumper section is connected to the second bracket. The second bumper section is also be connected to the first bumper section by a detachable connection. The first bumper section detaches from the second bumper section when the first bumper section is involved in a collision to reduce or eliminate damage to the second bumper section.

43 Claims, 6 Drawing Sheets

BUMPER ASSEMBLY

FIELD OF THE INVENTION

The present invention relates generally to a bumper assembly for an over-the-highway truck or tractor vehicle. In particular, the present invention relates to a bumper assembly that localizes damage to the bumper assembly in the event of a collision.

BACKGROUND OF THE INVENTION

Existing bumper assemblies for over the highway trucks or tractors include an elongated center section and a pair of end sections or end caps. Typically, the end sections are fastened to the center section. A single bracket often supports an end section and an end of the center section.

In many minor collisions, only an end section of the bumper assembly is collided with. When an end portion of an existing bumper is involved in a collision, the force of impact is transferred from the end section to the center section. As a result, both the end section and the center section of the bumper assembly are damaged. Similarly, the end sections may be damaged by a minor collision that only involves the center section. Damage to sections of the bumper assembly that are not impacted in a collision increases the repair cost.

The sections of existing bumper assemblies are typically painted individually in an unassembled state. Painting the sections separately increases the time required to produce a bumper assembly and the cost of the bumper assembly.

There is a need for a new bumper assembly that localizes damage. There is a need for a bumper assembly that may be painted in an assembled condition.

SUMMARY OF THE INVENTION

The present invention concerns a bumper assembly of an over the highway vehicle that localizes damage to sections of the assembly that are involved in a collision. The bumper assembly includes first and second mounting flanges that are coupled to the chassis of the vehicle. A first bumper section is connected to the first mounting flange. A second bumper section is connected to the second mounting flange. The first and second bumper sections are connected together by a detachable connection. The first bumper section detaches from the second bumper section when the first bumper section is involved in a collision.

Additional features are included in various embodiments of the invention. For example, the first and second mounting flanges may be included in first and second brackets. The first bracket may be constructed to deform away from the second bumper section when the first bumper section is involved in a collision. The first and second brackets may be connected to a chassis bracket that acts as a pivot point during an impact. The chassis bracket guides the first or second bracket away from the other bracket in the event of a collision. The first bracket may include a first flange that abuts the second bracket and a second flange that extends away from the second bracket. The first bumper section is secured to said second flange.

The detachable connection may include a latching projection extending from the first bumper section and a latching recess of the second bumper section that accepts the latching projection. The first bumper section is latched to the second bumper section when the latching projection is latched to the latching recess. The second bumper section may include a guiding projection that guides the latching projection into the latching recess during assembly of the first bumper section to the second bumper section. The latching projection and the latching recess align the first bumper section with respect to the second bumper section in three directions. A plurality of latching projections and latching recesses may be included.

In one embodiment, the bumper assembly includes inner and outer brackets coupled to a chassis component. A center bumper section is connected to the inner bracket. An end bumper section or end cap is connected to the outer bracket. The outer bracket is configured to bend when the end bumper section is involved in a collision. The end bumper section is guided away from the center bumper section by the outer bracket to reduce damage to the center section.

In one embodiment, the bumper assembly facilitates painting of the bumper assembly in an assembled condition. In this embodiment, the bumper assembly includes a first bumper section and a second bumper section. The first bumper section includes a plurality of bumps. The second bumper section is coupled to the first bumper section. The bumps space the first bumper section from the second bumper section. The spacing facilitates painting of the first and second bumper sections in an assembled condition. In one embodiment, the spacing is in the range of 1 mm to 5 mm.

In one embodiment, when a bumper assembly is involved in a collision a bracket that supports the first bumper sections deforms away from the second bumper section and the second bracket when the first bumper section is involved in a collision. During the collision, the first bumper section detaches from the second bumper section.

Additional features of the invention will become apparent and a fuller understanding will be obtained by reading the following detailed description in connection with the accompanying drawings.

DETAILED DESCRIPTION OF THE INVENTION

Figures 1, 2:
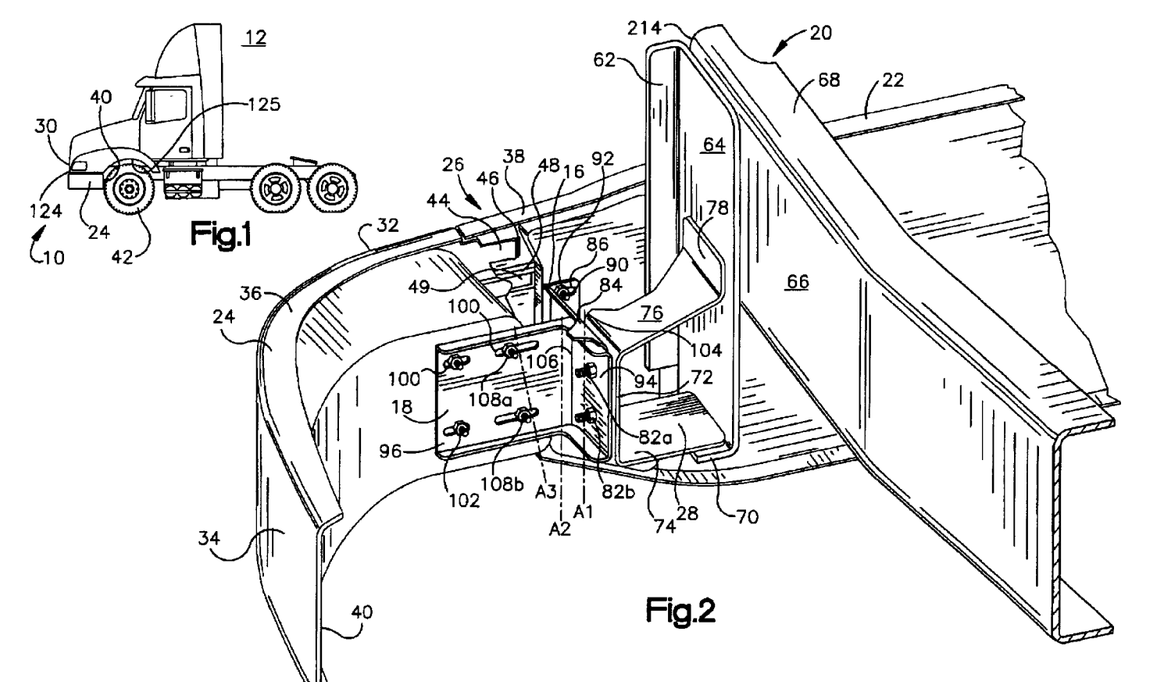
FIG. 1 is a side elevational illustration of an over the highway tractor having a bumper assembly embodying the present invention.
FIG. 2 is a partial perspective view of a bumper assembly embodying the present invention.
Figure 3:
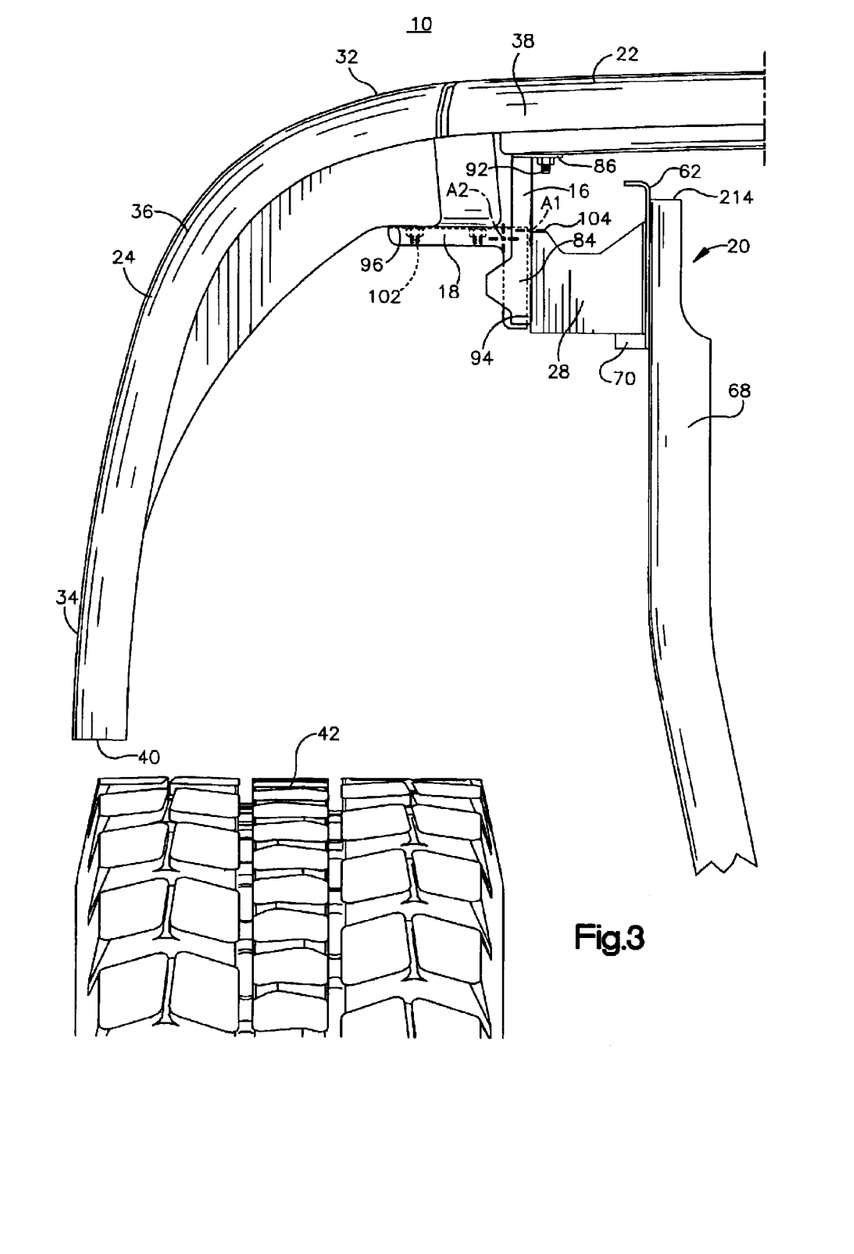
FIG. 3 is a partial plan view of a bumper assembly embodying the present invention.

The present disclosure is directed to a bumper assembly 10 for an over the highway vehicle 12, such as an over the highway truck or tractor. The bumper assembly 10 includes first and second brackets coupled to a chassis component of the over the highway vehicle. Referring to FIGS. 2 and 3, in the illustrated embodiment the first and second brackets are an inner bracket 16 and an outer bracket 18 that are coupled to a frame 20 of the vehicle 12. First and second bumper sections are connected to the first and second brackets. In the illustrated embodiment, a center bumper section 22 is mounted to the inner bracket 16 and an end bumper section 24 is mounted to the outer bracket 18. In the exemplary embodiment, the first and second bumper sections are connected by a detachable connection 26. In the illustrated embodiment, the end bumper section 24 and center bumper section 22 detach from one another when one of the bumper sections are involved in a collision.

In the exemplary embodiment, the inner bracket 16 and outer bracket 18 are configured to localize damage to the bumper assembly to the components of the assembly that are involved in the collision. In the illustrated embodiment, the outer bracket 18 is configured to bend away from the inner bracket 16 and the center bumper section 22 when the end bumper section 24 is involved in a collision. This bending guides the end bumper section away from the center bumper section to reduce damage to the center bumper section 22. Similarly, the inner bracket 16 is configured to bend away from the outer bracket 18 and end bumper section 24 when the center bumper section is involved in a collision. This bending guides the center bumper section 22 away from the end bumper section 24, reducing or eliminating damage to the end bumper section.

In the illustrated embodiment, the inner and outer brackets 16, 18 are connected to the frame 20 by a chassis bracket 28. The chassis bracket 28 acts as a pivot point during an impact. The chassis bracket 28 helps to guide the inner bracket away from the outer bracket when the center bumper section is involved in a collision and the outer bracket away from the inner bracket when the end bumper section is involved in a collision.

In the exemplary embodiment, the bumper assembly 10 is mounted at a front end 30 of the vehicle 12. The bumper assembly includes two end bumper sections 24 and one center bumper section 22. Only one end bumper section 24 and one end 38 of the center bumper section 22 is shown, since the second end bumper section and second end of the center bumper section are substantially mirror images of illustrated end bumper section and end of the center bumper section. In the illustrated embodiment, the end bumper sections and the center bumper section are constructed from plastic. One or more of the bumper sections may be made from a metal, such as steel or aluminum, carbon fiber or any other suitable material.

The end bumper sections 24 each include a front portion 32 and a side portion 34. In the illustrated embodiment, the front portion 32 is aligned with or is somewhat in front of the vehicle. The front portion 32 could be recessed with respect to the front of the vehicle. In the illustrated embodiment, the side portion 34 is aligned with or somewhat outward of the vehicle. The side portion 32 could be inward of the vehicle. An end 40 of the end bumper section 24 is located in front of a front tire 42. The front and side portions 32, 34 are connected by a curved portion 36.

The center bumper section extends between the two end bumper sections 24. In the exemplary embodiment, each end 38 of the center bumper section is connected to the end bumper section 24 by the detachable connection 26.

Figure 4:
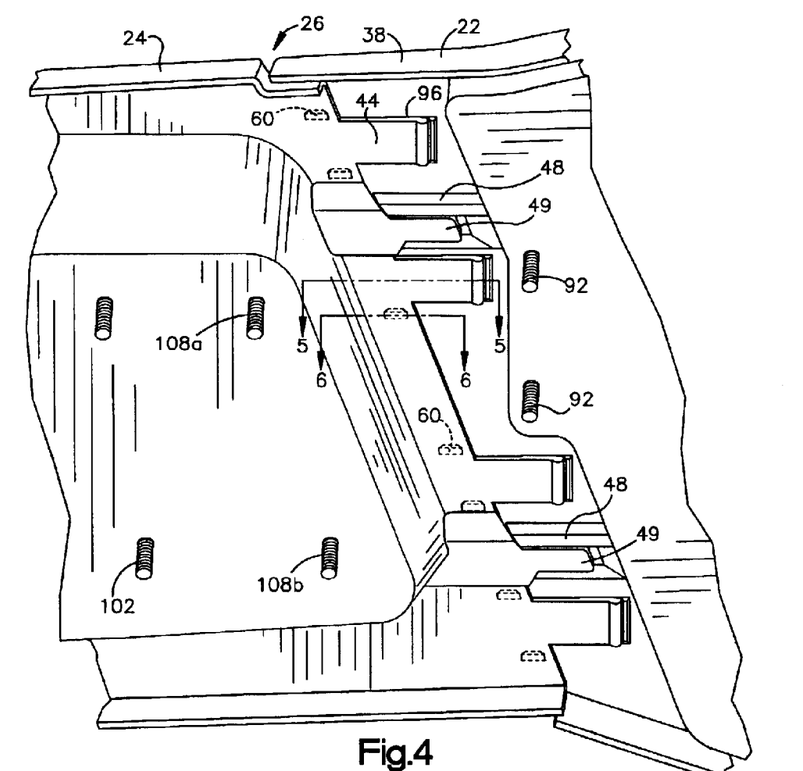
FIG. 4 is a partial perspective view of a detachable connection of a first bumper section to a second bumper section.
Figure 5:
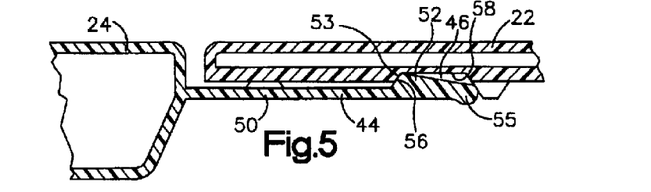
FIG. 5 is a sectional view taken along lines 5—5 of FIG. 4.

FIGS. 4 and 5 illustrate a detachable connection 26 of the exemplary embodiment. The illustrated detachable connection 26 comprises a plurality of latching projections 44 and a plurality of corresponding latching recesses 46. In the illustrated embodiment, the latching projections 44 extend from the end bumper section 24 and the latching recesses 46 are formed in the center bumper section 22. In alternate embodiments, the latching projections 44 may extend from the center bumper section 22 and the latching recesses 46 may be formed in the end bumper section 24 or some of the latching projections 44 may extend from each of the end bumper section 24 and the center bumper section 22 and corresponding latching recesses are formed in the center and end bumper sections 22, 24. Each latching recess accepts a latching projection. The end bumper section 24 is latched to the center bumper section 22 when the latching projections are latched in the latching recesses.

The latching projections and latching recesses align the end bumper section with respect to the center bumper section in all three directions. The spacing between the center bumper section 22 and the end bumper section 24, the alignment of the fronts of the bumper sections, and the alignment of the tops and bottoms of the bumper sections are maintained by the latching projections and latching recesses.

In the illustrated embodiment, the center bumper section includes two pairs of guiding projections 48. The end bumper section includes two guiding fingers 49. These guiding fingers 49 do not include a latching mechanism in the illustrated embodiment. One guiding projection is located adjacent to each side of each guiding finger 49. The guiding projections 48 and guiding fingers 49 guide the latching projections 44 into the latching recesses 46 during assembly of the end bumper sections to the center bumper section.

FIG. 5 is a sectional view showing a latching projection 44 latched in a latching recess 46. The latching projection includes an elongated portion 50 and a projection or tongue 52. The tongue 52 includes an inclined surface 53 that extends away from the elongated portion 50 and toward an end 55 of the latching projection, forming an obtuse angle between the surface 53 and the elongated portion 50. The illustrated latching recess 46 is a concavity having an inclined wall 56. An obtuse angle is formed between the inclined wall 56 and an inner surface 58 of the recess 46.

In the illustrated embodiment, the latching projection latches to the latching recess when the tongue 52 is moved into the latching recess 46. The inclined surface 53 of the tongue frictionally engages the inclined wall 56 of the recess. The inclination of the surface 53 and wall 56 allows the latching projection 44 to detach from the latching recess 46 when the end bumper section is pulled away from the center bumper section with enough force. The inclined surface 53 slides up the inclined wall 56 as the latching projections 44 and latching recesses 46 are puled apart. The slope of the inclined surface 53 and the inclined wall 56 determines the amount of force required to pull the latching projection 44 apart from the latching recess 46. A connection that includes a relatively steep inclined surface and wall requires more force to pull apart than a connection that includes a relatively flat inclined surface and wall.

Figure 11:
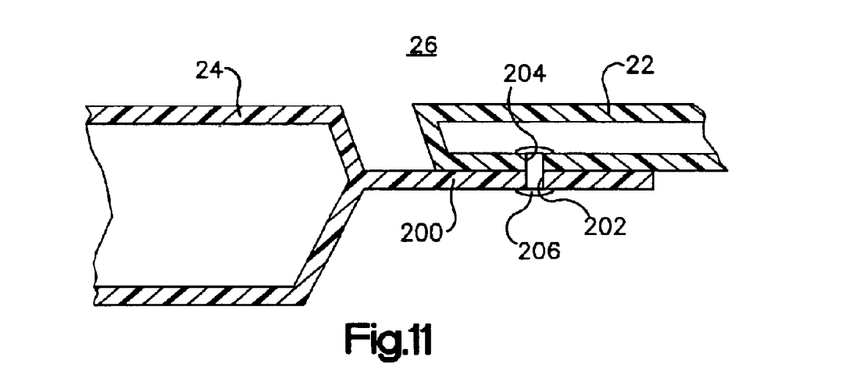
FIG. 11 is a sectional view of a detachable connection of an alternate embodiment.
Figure 12:
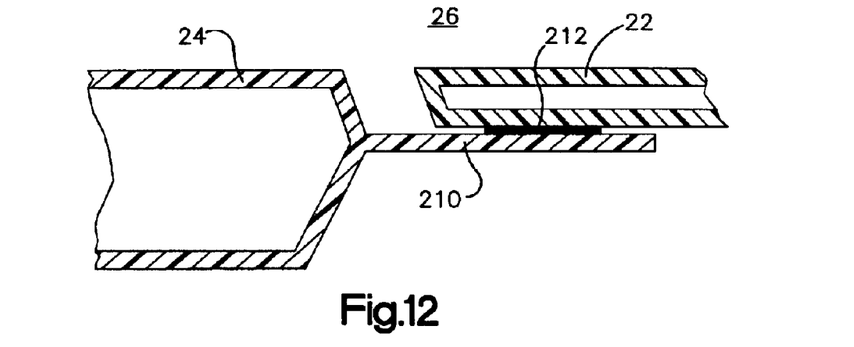
FIG. 12 is a sectional view of a detachable connection of an alternate embodiment.

FIGS. 11 and 12 illustrate detachable connections 26 of alternate embodiments. The detachable connection 26 illustrated by FIG. 11 includes one or more projections 200 that extend from the end bumper section 24 toward the center bumper section 22. The projection 200 includes one or more holes 202 that are aligned with hole(s) 204 in the center bumper section 22. A rivet 206 in each pair of holes 202, 204 secures the center bumper section 22 to the end bumper section 24. In the embodiment illustrated by FIG. 11, the rivet 206 is made from a relatively weak material, such as a soft plastic so that the rivet 206 breaks when the center bumper section 22 and the end bumper section 24 are forcefully pulled relatively away from one another.

The detachable connection 26 illustrated by FIG. 12 includes one or more projections 210 that extend from the end bumper section 24 toward the center bumper section 22. A piece of double stick tape 212 secures the center bumper section 22 to the end bumper section 24. In the embodiment illustrated by FIG. 12, the double stick tape 212 pulls off of one of the center bumper section 22 and the end bumper section and/or tears when the center bumper section 22 and the end bumper section 24 are forced relatively apart, allowing the bumper sections to disengage.

Figure 6:
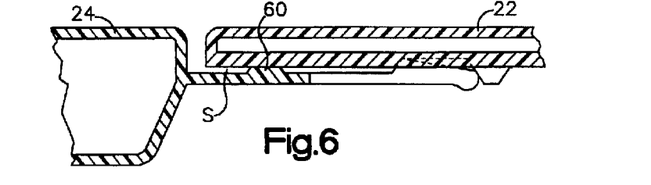
FIG. 6 is a sectional view taken along lines 6—6 of FIG. 4.

Referring to FIGS. 4 and 6, the bumper assembly includes bumps 60 that space the end bumper sections 24 apart from the center bumper section 22. In the illustrated embodiment, the end bumper section 24 includes a plurality of formed bumps. The bumps on the end bumper section 24 maintain a spacing S between the end bumper section 24 and the center bumper section 22. The bumps may be between 1 mm and 5 m high. For example, the bumps may be 3 mm high. The spacing S provided by the bumps allows the bumper assembly to be painted in an assembled condition. In the exemplary embodiment, paint is applied to the bumper assembly electrostatically. The spacing S allows the electrostatically applied paint to reach areas of the sections that overlap.

FIGS. 2 and 3 show how the end bumper section 24 and center bumper section 22 are coupled to the frame 20. A frame bracket 62 is connected to the frame 20 by welding, fasteners or by other means generally known in the art. The frame bracket is made from steel in the exemplary embodiment. In the illustrated embodiment, the frame bracket extends below the frame to position the end bumper sections and the center bumper section 22 below the frame. It should be readily apparent to those skilled in the art that the bumper assembly could also be aligned with the frame or could be positioned above the frame. The frame bracket 62 includes a panel 64 that is generally parallel to a side surface 66 of a frame rail 68. A lower flange 70 extends from the panel 64 toward the end bumper section 24.

The chassis bracket 28 is connected to the frame bracket 62. The illustrated chassis bracket 28 includes a mounting portion 72, a lower leg 74, an upper leg 76 and a flange 78. The mounting portion 72 is a generally flat plate that facilitates attachment of the inner bracket 16 and the outer bracket 18. The mounting portion 72 includes holes for attachment of the inner bracket and the outer bracket with fasteners 82a, 82b. The lower leg 74 extends from the mounting portion 72 to the lower flange 70 of the frame bracket 62. The lower leg 74 is connected to the lower flange 70. The upper leg 76 extends from the mounting portion 72 to the frame bracket 62. In the illustrated embodiment, the upper leg extends upward from the mounting portion 72 to the frame bracket. The flange 78 abuts and is connected to the panel 64 to connect the upper leg 76 to frame bracket 62.

In the illustrated embodiment, the inner bracket 16 is a substantially "L" shaped bracket that includes a first flange 84 and a second flange 86. The first flange 84 abuts the mounting portion 72 of the chassis bracket 28. The first flange includes holes or slots that are aligned with the holes in the chassis bracket 28. The second flange 86 or mounting flange extends from the first flange 84 toward the frame rail 68. The second flange includes mounting holes 90 or slots. In the illustrated embodiment, studs 92 that are included in the center bumper section and extend through the holes 90 to secure the center bumper section to the inner bracket. It should be readily apparent to those skilled in the art that any type of fastener could be used to secure the center bumper section to the inner bracket. The chassis bracket 28 acts as a pivot point during an impact that guides the inner bracket away from the outer bracket in the event of a collision.

In the illustrated embodiment, the outer bracket 18 is a substantially "L" shaped bracket that includes a first flange 94 and a second flange 96 or mounting flange. The first flange 94 abuts the first flange 84 of the inner bracket 16. The first flange includes holes or slots that are aligned with the holes in the first flange of the inner bracket 16. In the illustrated embodiment, threaded fasteners 82a, 82b that extend through the holes in the chassis bracket, the inner bracket and the outer bracket are used to secure the inner bracket 16 and the outer bracket 18 to the chassis bracket 28. The second flange 96 extends from the first flange 94 away from the frame rail 68. The second flange includes mounting holes or slots. In the exemplary embodiment, studs 102 that are included in the end bumper section and extend through the holes 100 are used to secure the end bumper section to the outer bracket. It should be readily apparent to those skilled in the art that any type of fastener could be used to secure the end bumper section to the outer bracket. The chassis bracket 28 acts as a pivot point during an impact that guides the outer bracket away from the inner bracket in the event of a collision.

The coupling of the bumper sections to the frame shown in FIGS. 2 and 3 is only one of many ways the bumper sections could be attached to the vehicle. Those skilled in the art may mount the bumper section to the vehicle other than as shown or described without departing from the spirit and scope of the invention. For example, the following modifications could be made to the coupling of the bumper sections to the vehicle. The frame bracket 62 could be omitted and the chassis bracket 28 could be configured to attach directly to the frame rail. The frame bracket 62 and the chassis bracket could be omitted and the inner and outer brackets 16, 18 could be secured directly to the frame rail. In this embodiment, it is contemplated that an end 214 of the frame rail 68 would abut the inner bracket 16 along an axis about which bending of the inner bracket 16 is desired when the center bumper section 22 is impacted. The inner bracket 16 and outer bracket 18 could be combined into a single bracket that includes a mounting flange for connection to the center bumper section and a mounting flange for connection to the end bumper section. The inner and outer brackets could be combined by welding two pieces together or by forming a bracket out of a single piece of material that includes a flange for the end bumper section, a flange for the center bumper section and a flange for connection to the vehicle. In the exemplary embodiment, the flange that supports the center bumper section is designed to maintain its original shape when the end bumper section is involved in a collision and the flange that supports the end bumper section bends.

Similarly, the flange that supports the end bumper section is designed to maintain its original shape when the center bumper section is involved in a collision and the flange that supports the center bumper section bends.

FIGS. 7–10 illustrate how components of the bumper assembly are effected by collisions. FIGS. 7–10 do not show the latching projections 44 and latching recesses that are included in the exemplary embodiment. Axis A1 is defined by the intersection of the inner bracket 16 and the edge 104 of the chassis bracket 28. Axis A1 is generally vertical in the exemplary embodiment. In the illustrated embodiment, a large portion of the bending of the inner bracket 16 occurs about axis A1.

Axis A2 is defined by a bend 106 between the first flange 94 and the second flange 96 of the outer bracket and a position of the fasteners 82*a*, 82*b*. A portion of the bending of the outer bracket will occur about axis A2. Axis A2 is generally vertical in the illustrated embodiment. The orientation of axis A2 can be canted by shifting position of the fasteners 82*a*, 82*b*. Moving one of the fasteners farther away from bend 106 will result in more bending of the first flange 94 near the fastener that is moved away from the bend. As a result, the axis A2 will be canted toward a fastener that is moved away from the bend 106. For example, moving the top fastener 82*a* away from the bend 106 will result in more bending of the flange 94 near the top of the bracket. As a result, the upper end of axis A2 would be canted away from the center bumper section 22. Similarly, the position of axis A2 can be moved away from the center bumper section by moving both the fasteners 82*a*, 82*b* away from the center bumper section.

The outer bracket also bends about an axis A3. Axis A3 is defined by fasteners 108*a*, 108*b* that secure the end bumper section to the outer bracket 18. The second flange 96 will bend at the points where the fasteners abut the second flange closest to the bend 106. The second flange will bend along axis A3 that extends through these points. Since axis A3 is defined by the positions of fasteners 108*a*, 108*b*, the orientation of axis A3 can be adjusted by changing the positions of fasteners 108*a*, 108*b*. In the illustrated embodiment, axis A3 is tilted.

Figure 7:
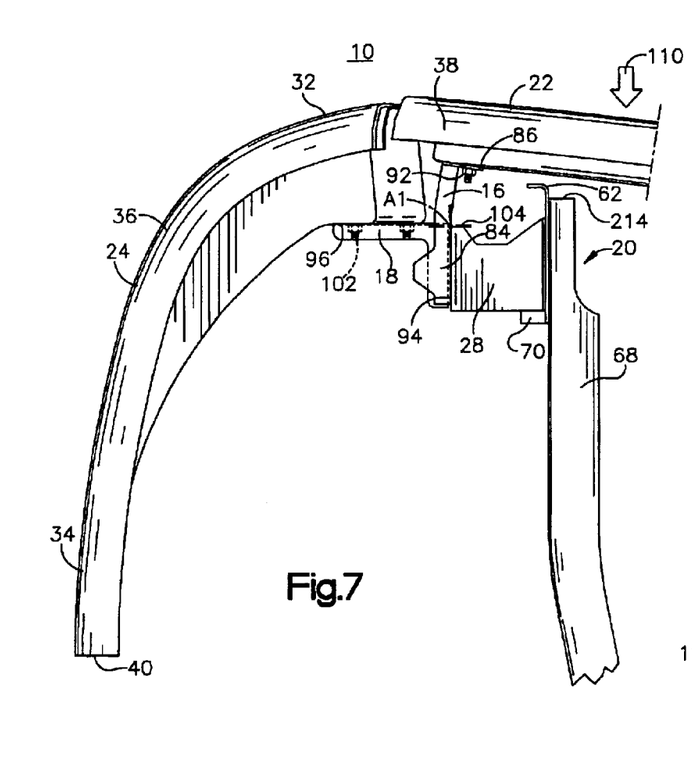
FIG. 7 is a top plan view of a bumper assembly embodying the present invention illustrating an impact to a center bumper section.

FIG. 7 illustrates the effect of an impact (indicated by arrow 110) to the center bumper section 22 on the bumper assembly 10. The illustrated impact 110 to the center bumper section 22 pushes the center bumper section inward. The latching recesses 46 pull away from the latching projections 44 to detach the center bumper section 22 from the end bumper section 24. The inner bracket 16 bends along axis A1. Bending of the inner bracket 16 about axis A1 guides the inner bracket 16 away from the outer bracket 18. This bending also guides the center bumper section 22 away from the end bumper section 24. As a result, the damage to the bumper assembly is localized to the center bumper section and the inner bracket. The end bumper section 24 and the outer bracket 18 are not damaged in the exemplary embodiment.

Figure 8:
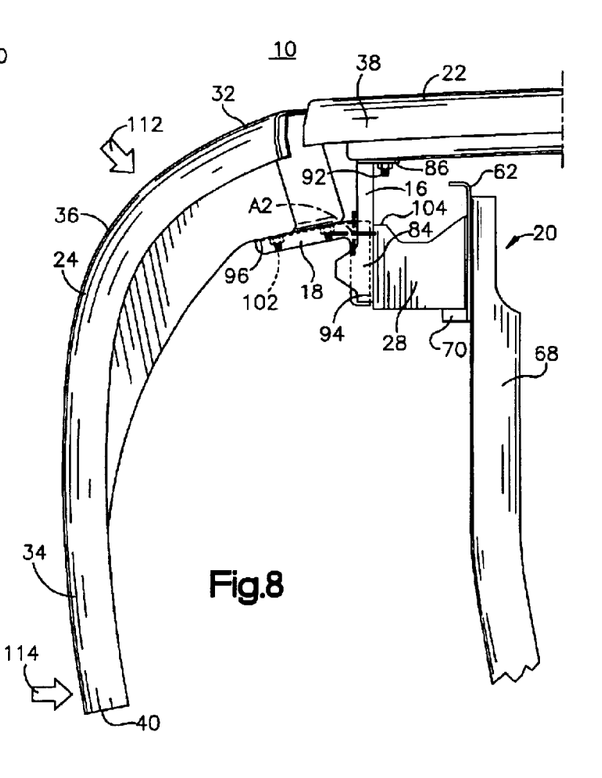
FIG. 8 is a top plan view of a bumper assembly embodying the present invention illustrating an impact to an end bumper section.
Figure 10:
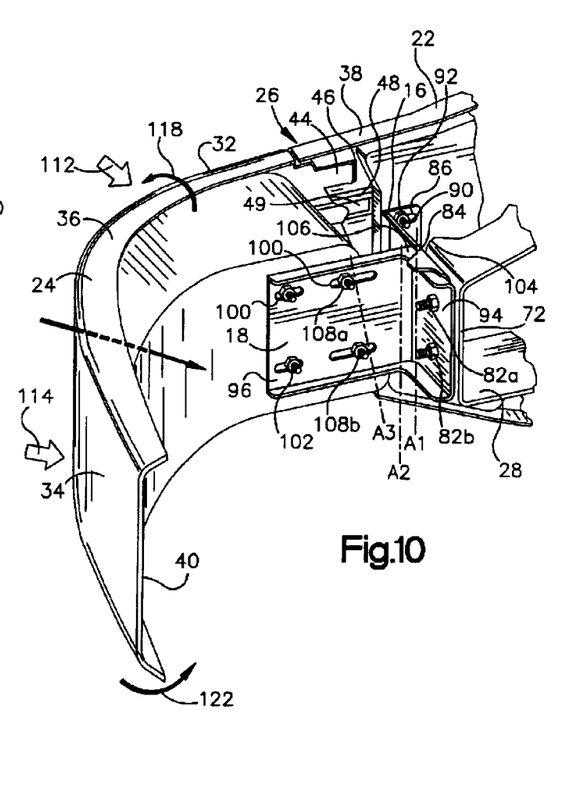
FIG. 10 is a perspective view of a bumper assembly embodying the present invention illustrating an impact to an end bumper section.

FIGS. 8 and 10 illustrate the effect of impacts (indicated by arrows 112 and/or 114) to the end bumper section 24 on the bumper assembly 10. The illustrated impacts 112, 114 to the end bumper section 24 push the end bumper section inward. The latching projections 44 pull away from the latching recesses 46 to detach the end bumper section 24 from the center bumper section 22. The outer bracket 18 bends along axis A2 and along axis A3. The bending of the outer bracket 18 about axis A2 guides the outer bracket 18 away from the inner bracket 16. This bending also guides the end bumper section 24 away from the center bumper section 22. The bending of the outer bracket 18 about the tilted axis A3 causes the front portion 32 of the end bumper section 24 to tilt down as indicated by arrow 118 and the side portion 34 to tilt up as indicated by arrow 122. As the front portion tilts down, it clears the structure 124 above the bumper assembly (hood and headlamp assembly in the exemplary embodiment). The side portion tilts up into the wheel well 125 in front of the front tire 42, avoiding all structures. As a result, the damage to the bumper assembly is localized to the end bumper section and the outer bracket. The center bumper section 22, the inner bracket 16 and the tire 42 are not damaged in the exemplary embodiment.

Figure 9:
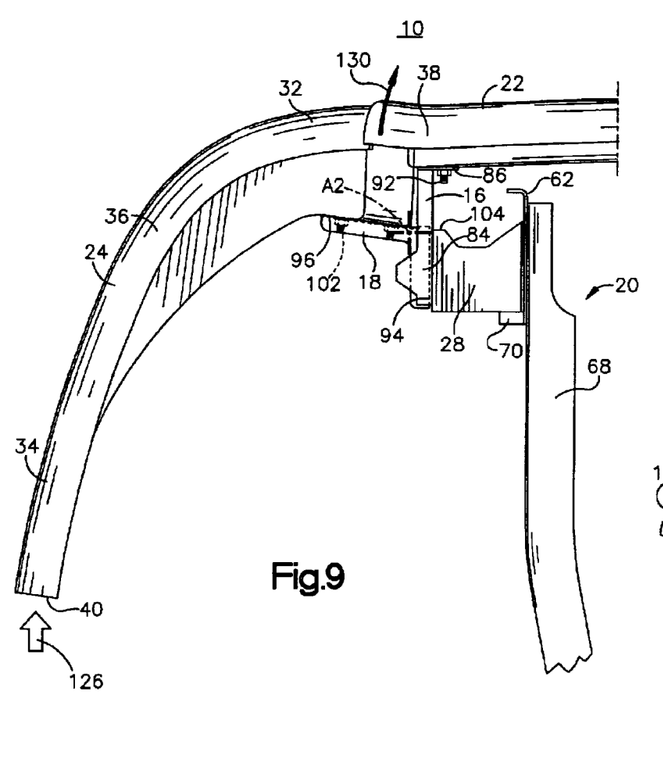
FIG. 9 is a top plan view of a bumper assembly embodying the present invention illustrating an impact to an end bumper section.

FIG. 9 illustrates the effect of an impact (indicated by arrow 126) to the end 40 of the end bumper section 24 on the bumper assembly 10. This type of impact can occur when the vehicle 12 is backing up and the end 40 gets caught on an object that is not seen by the driver. The illustrated impact 126 to the end bumper section 24 pushes the end 40 of the end bumper section forward. The outer bracket 18 bends along axis A2. This bending causes the latching projections 44 to rotate inward out of the latching recesses 46 to disengage the end bumper section 24 from the center bumper section 26. The latching projections 44 guide the end bumper section 24 behind the center bumper section. The center bumper section flexes out as indicated by arrow 130 but does not break in the exemplary embodiment. The damage to the bumper assembly is localized to the end bumper section 24 and the outer bracket 18. The inner bracket 18 is not deformed in the exemplary embodiment.

Although the present invention has been described with a degree of particularity, it is the intent that the invention include all modifications and alterations falling within the spirit or scope of the appended claims.

We claim:

1. A bumper assembly of an over the highway vehicle, comprising:
    a) a first mounting flange coupled to a chassis component of the over the highway vehicle;
    b) a second mounting flange coupled to said chassis component of the over the highway vehicle;
    c) a first bumper section connected to said first mounting flange;
    d) a second bumper section securely connected to said second mounting flange and connected to said first bumper section by a detachable connection, wherein said first bumper section detaches from said second bumper section when said first bumper section is involved in a collision;
    e) wherein said first flange is included on a first bracket and said second flange is included on a second bracket.

2. The bumper assembly of claim 1 wherein said first flange is constructed to deform away from said second bumper section and said second flange when said first bumper section is involved in a collision.

3. The bumper assembly of claim 1 wherein said first and second brackets are connected to a chassis bracket that acts as a pivot point during an impact that guides one of the first bracket and the second bracket away from the other of the first bracket and the second bracket in the event of a collision.

4. The bumper assembly of claim 1 wherein said first bracket includes a first flange that abuts said second bracket and a second flange that extends away from said second bracket and wherein said first bumper section is secured to said second flange.

5. The bumper assembly of claim 1 wherein said detachable connection comprises a plastic rivet.

6. The bumper assembly of claim 1 wherein said detachable connection comprises a piece of double sided tape.

7. The bumper assembly of claim 1 wherein said first bumper section includes a plurality of bumps that space said first bumper section from said second bumper section.

8. The bumper assembly of claim 7 wherein a spacing between said first bumper section and said second bumper section is in the range of 1 mm to 5 mm.

9. The bumper assembly of claim 1 wherein said detachable connection comprises a latching projection extending from said first bumper section and a latching recess of said second bumper section that accepts said latching projection, wherein said first bumper section is latched to said second bumper section when said latching projection is latched to said latching recess.

10. The bumper assembly of claim 9 wherein second bumper section includes a guiding projection that guides said latching projection into said latching recess during assembly of said first bumper section to said second bumper section.

11. The bumper assembly of claim 9 wherein said latching projection and said latching recess aligns said first bumper section with respect second bumper section in three directions.

12. A bumper assembly of an over the highway vehicle, comprising:
  a) an inner bracket coupled to a chassis component of the over the highway vehicle;
  b) an outer bracket coupled to said chassis component of the over the highway vehicle;
  c) a center bumper section connected to the inner bracket; and
  d) an end bumper section connected to the outer bracket, wherein said outer bracket is configured to bend when the end bumper section is involved in a collision such that said end bumper section is guided away from said center bumper section to reduce damage to said center section;
  e) wherein said inner bracket is configured to bend when the center bumper section is involved in a collision such that said center bumper section is guided away from said end bumper section to reduce damage to said end bumper section.

13. The bumper assembly of claim 12 wherein said outer bracket is configured to bend away from said inner bracket when said end bumper section is involved in a collision.

14. The bumper assembly of claim 12 wherein said outer bracket is connected to a chassis bracket that acts as a pivot point during an impact that guides the outer bracket away from the inner bracket in the event of a collision.

15. The bumper assembly of claim 12 wherein said inner bracket is connected to a chassis bracket that acts as a pivot point during an impact that guides the inner bracket away from the outer bracket in the event of a collision.

16. The bumper assembly of claim 12 wherein said outer bracket includes a first flange that abuts said inner bracket and a second flange that extends away from said inner bracket and wherein said end bumper section is secured to said second flange.

17. The bumper assembly of claim 12 wherein said inner bracket includes a first flange that abuts said outer bracket and a second flange that extends away from said outer bracket and wherein said center bumper section is secured to said second flange.

18. The bumper assembly of claim 12 wherein one of said end bumper section and said center bumper section includes a plurality of bumps that space said end bumper section from said center bumper section.

19. The bumper assembly of claim 18 wherein a spacing between said end bumper section and said center bumper section is in the range of 1 mm to 5 mm.

20. The bumper assembly of claim 12 wherein one of said end bumper section and said center bumper section includes a latching projection and an other of said end bumper section and said center bumper section includes a latching recess that accepts said latching projection, wherein said end bumper section is latched to said center bumper section when said latching projection is latched to said latching recess.

21. The bumper assembly of claim 20, wherein one of said end bumper section and said center bumper section includes a guiding projection that guides said latching projection into said latching recess during assembly of said end bumper portion to said center bumper portion.

22. The bumper assembly of claim 20 wherein said end bumper portion includes a plurality of latching projections and said center bumper portion includes a plurality of latching recesses.

23. The bumper assembly of claim 20 wherein said center bumper portion includes a plurality of latching projections and said end bumper portion includes a plurality of latching recesses.

24. The bumper assembly of claim 20 wherein said latching projection and said latching recess aligns said end bumper portion with respect center bumper portion in three directions.

25. A bumper assembly of an over the highway vehicle, comprising:
  a) an inner bracket coupled to a chassis component of the over the highway vehicle;
  b) an outer bracket coupled to said chassis component of the over the highway vehicle;
  c) a center bumper section connected to the inner bracket; and
  d) an end bumper section connected to the outer bracket, wherein said outer bracket is configured to bend when the end bumper section is involved in a collision such that said end bumper section is guided away from said center bumper section to reduce damage to said center section;
  e) wherein said inner bracket is configured to bend away from said outer bracket when said center bumper section is involved in a collision.

26. The bumper assembly of claim 25 wherein said outer bracket is configured to bend away from said inner bracket when said end bumper section is involved in a collision.

27. The bumper assembly of claim 25 wherein said outer bracket is connected to a chassis bracket that acts as a pivot point during an impact that guides the outer bracket away from the inner bracket in the event of a collision.

28. The bumper assembly of claim 25 wherein said inner bracket is connected to a chassis bracket that acts as a pivot point during an impact that guides the inner bracket away from the outer bracket in the event of a collision.

29. The bumper assembly of claim 25 wherein said outer bracket includes a first flange that abuts said inner bracket and a second flange that extends away from said inner bracket and wherein said end bumper section is secured to said second flange.

30. The bumper assembly of claim 25 wherein said inner bracket includes a first flange that abuts said outer bracket and a second flange that extends away from said outer bracket and wherein said center bumper section is secured to said second flange.

31. The bumper assembly of claim 25 wherein one of said end bumper section and said center bumper section includes a plurality of bumps that space said end bumper section from said center bumper section.

32. The bumper assembly of claim 31 wherein a spacing between said end bumper section and said center bumper section is in the range of 1 mm to 5 mm.

33. The bumper assembly of claim 25 wherein one of said end bumper section and said center bumper section includes a latching projection and an other of said end bumper section and said center bumper section includes a latching recess that accepts said latching projection, wherein said end bumper section is latched to said center bumper section when said latching projection is latched to said latching recess.

34. The bumper assembly of claim 33 wherein one of said end bumper section and said center bumper section includes a guiding projection that guides said latching projection into said latching recess during assembly of said end bumper portion to said center bumper portion.

35. The bumper assembly of claim 33 wherein said end bumper portion includes a plurality of latching projections and said center bumper portion includes a plurality of latching recesses.

36. The bumper assembly of claim 33 wherein said center bumper portion includes a plurality of latching projections and said end bumper portion includes a plurality of latching recesses.

37. The bumper assembly of claim 33 wherein said latching projection and said latching recess aligns said end bumper portion with respect center bumper portion in three directions.

38. A bumper assembly of an over the highway vehicle that facilitates painting of the bumper assembly in an assembled condition, comprising:
    a) a first bumper section that includes a plurality of bumps;
    b) a second bumper coupled to said first bumper section, said bumps space said first bumper section from said second bumper section to facilitate painting of the first and second bumper sections in an assembled condition.

39. The bumper assembly of claim 38 wherein a spacing between said first bumper section and said second bumper section is in the range of 1 mm to 5 mm.

40. A bumper assembly of an over the highway vehicle, comprising:
    a) a chassis bracket connected to a chassis of the over the highway vehicle;
    b) an inner bracket having a first inner bracket flange connected to the chassis bracket and a second inner bracket flange that extends orthogonally from said first inner bracket flange;
    c) an outer bracket having a first outer bracket flange connected to said first inner bracket flange and a second outer bracket flange that extends away from said inner bracket;
    d) a center bumper section connected to said second inner bracket flange;
    e) a plurality of latching recesses formed in said center bumper section;
    f) an end bumper section connected to the second outer bracket flange; and
    g) a plurality of latching projections latched to said plurality of latching recesses.

41. A method for reducing damage to a section of a bumper assembly of an over the highway truck or tractor, said method comprising:
    a) supporting a first bumper section with a first bracket that is coupled to a chassis component of the over the highway vehicle;
    b) supporting a second bumper section with a second bracket coupled to a chassis component of the over the highway vehicle;
    c) detachably connecting said first bumper section to said second bumper section;
    d) deforming said first bracket away from said second bumper section and said second bracket when said first bumper section is involved in a collision; and
    e) detaching said first bumper section from said second bumper section.

42. A method of painting a bumper assembly of an over the highway vehicle in an assembled condition, comprising:
    a) assembling a first bumper section to a second bumper section;
    b) spacing the first bumper section from the second bumper section with bumps on the first bumper section;
    c) applying paint to the bumper assembly.

43. The method of claim 42 wherein said paint is electrostatically applied to said bumper assembly.

* * * * *